United States Patent
Meier et al.

[11] Patent Number: 6,121,738
[45] Date of Patent: Sep. 19, 2000

[54] SYSTEM FOR CONTROLLING A WINDSCREEN/REAR SCREEN WIPER

[75] Inventors: Hans Meier, Ottersweier; Guenther Riehl, Buehlertal; Henry Blitzke, Buehl; Manfred Burkart, Iffezheim, all of Germany

[73] Assignee: Robert Bosch GmbH, Stuttgart, Germany

[21] Appl. No.: 09/147,965

[22] PCT Filed: Sep. 20, 1997

[86] PCT No.: PCT/DE97/02135

§ 371 Date: Jun. 10, 1999

§ 102(e) Date: Jun. 10, 1999

[87] PCT Pub. No.: WO98/13237

PCT Pub. Date: Apr. 2, 1998

[30] Foreign Application Priority Data

Sep. 24, 1996 [DE] Germany ............... 196 39 137

[51] Int. Cl.[7] ................................................. H02P 7/00
[52] U.S. Cl. .......................... 318/280; 318/DIG. 2; 318/443; 318/444; 318/483; 318/445; 318/461; 15/250.17; 307/9.1; 307/10.1
[58] Field of Search .................. 318/280, DIG. 2, 318/443, 444, 483, 445, 461; 15/250.17; 307/9.1, 10.1

[56] References Cited

U.S. PATENT DOCUMENTS 4,881,019  11/1989  Shiraishi et al. ..................... 318/444

FOREIGN PATENT DOCUMENTS 44 23 954 A1  1/1996  Germany.

OTHER PUBLICATIONS

Patent Abstracts of Japan vol. 010, No. 006 (M–445), Jan. 11, 1986 & JP 60 169356 A (Nissan Jidosha KK), Sep. 2, 1985, see abstract.

Patent Abstracts of Japan vol. 009, No. 319 (M–439), Dec. 14, 1985 & JP 60 154940 A (Fuji Jukogyo KK), Aug. 14, 1985, see abstract.

Patent Abstracts of Japan vol. 009, No. 060 (M–364), Mar. 16, 1985 & JP 59 195454 A (Furukawa Denki Kogyo KK), Nov. 6, 1984, see abstract.

DE 3737653 A May. 24, 1989 FR 2622853 A May 12, 1989.

DE 19505011 A Aug. 22, 1996 WO 9625311 A Aug. 22, 1996.

*Primary Examiner*—Karen Masih
*Attorney, Agent, or Firm*—Venable; Norman N. Kunitz

[57] ABSTRACT

Proposed is a control device (50) for a windshield wiper that serves in actuating a further window wiper. The control device (50), having an inventive embodiment, includes a control (18), whose signal output (20) provides first control signals (42) for actuating the windshield wiper, preferably a front windshield wiper (26) of a motor vehicle, and whose further signal output (22) provides further control signals (42) for actuating a further windshield wiper, preferably a rear window wiper (30).

5 Claims, 1 Drawing Sheet

SYSTEM FOR CONTROLLING A WINDSCREEN/REAR SCREEN WIPER

STATE OF THE TECHNOLOGY

The invention is based on a control device for a windshield wiper, preferably for a front windshield wiper of a motor vehicle, having at least one signal output of a control unit for first control signals to actuate the windshield wiper. It is generally known (e.g. DE-OS-44 23 954) to use an operator element that is mounted to the steering column switch to switch a rear window wiper installed in a motor vehicle, with the operator element permitting the preset functions of, for example, continuous wiping, intermittent wiping or washing. Continuous wiping can be combined to an extent with a fixed time interval to better adapt the wiping rate to the quantity of precipitation on the window and improve the wiping effect. With varying quantities of precipitation, however, the wiping frequency of the rear window wiper rarely meets the driver's needs regarding the wiping effect and good visibility. If the wiping frequency is too low, the driver's visibility is repeatedly impaired by the water layer building up on the rear windshield. If the wiping rate is too high, the wiper blades wear faster from dry-wiping the windshield.

Another drawback, which occurs when the motor vehicle is traveling at high speed in heavy rain, is the road spray that splashes onto the rear window from below. Road spray severely limits the driver's rear visibility, as well as safety.

SUMMARY AND ADVANTAGES OF THE INVENTION

The control device of the invention for a windshield wiper, preferably for a front windshield wiper of a motor vehicle, comprising a control unit having at least one signal output for providing first control signals to actuate the windshield wiper, and a further signal output for further control signals which differ from the first control signals, and with which a further windshield wiper, preferably a rear window wiper of the motor vehicle, can be actuated, has the advantage of automatically actuating the rear window wiper depending on the quantity of precipitation.

It is also known per se to actuate the front windshield wiper with measurement signals obtained by a rain sensor, so the front windshield wiper wipes the front windshield depending on the quantity of precipitation. In this case, the front windshield wiper is automatically controlled in intermittent operation and/or in continuous wiping operation. It would also be possible to operate the rear window wiper with a rain sensor mounted to the rear window; this would not be an economical and simple solution for the rear window wiper, however, because two separate controls with rain sensors would be necessary.

The control device of the invention uses the measurement signals of a rain sensor mounted in the wiping area of the wipers on the front windshield to individually i.e., independently control the front windshield wiper and the rear window wiper.

An advantage of this device is that it simplifies the switching of the steering column switch, because it is possible to operate the front and rear window wipers with a single operator element. This type of simplified switching is more cost-effective.

A further advantage is that the separate control with the second rain sensor for the rear window wiper is omitted, because the rear window wiper is operated by way of a further signal output of the control of the front windshield wiper.

Advantageous modifications and improvements of the features disclosed in the main claim ensue from the measures listed in the dependent claims. One particular advantage is the option of detecting the speed of the motor vehicle and evaluating the signals in the control. For example, the road spray splashing onto the rear window from below can be taken into consideration at high speeds. With further consideration of the vehicle-specific shape, such as the angle of inclination of the rear window, or the shape of the rear of the motor vehicle (notchback, station wagon, etc.), the measurement signals of a rain sensor suffice to automatically switch the front and rear window wipers on and off, varying more or less from one another.

BRIEF DESCRIPTION OF DRAWING

An embodiment of the invention is illustrated in the drawing and described in detail in the following description.

DETAILED DESCRIPTION OF THE PREFERRED EMBODIMENT

Figure 1:
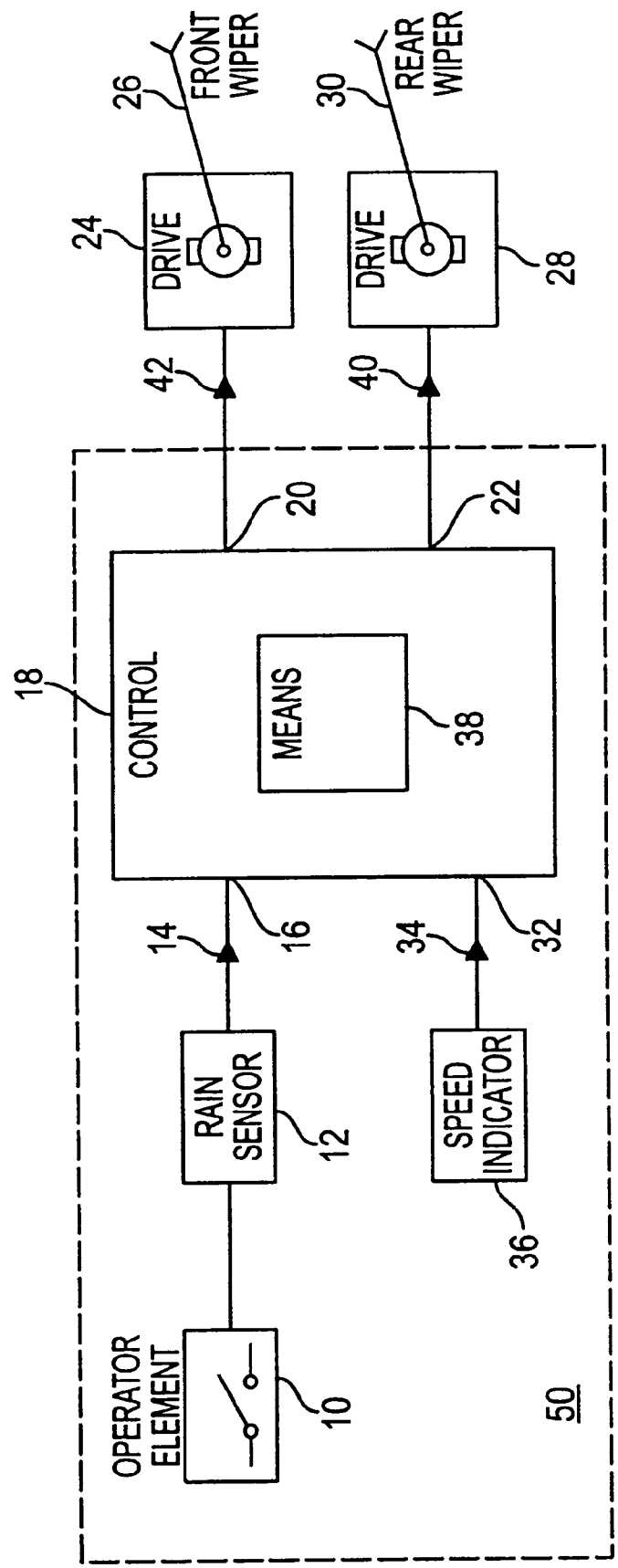
FIG. 1 shows a block diagram with a control device for actuating a front windshield wiper and a rear window wiper.

An operator element 10 mounted to a steering column switch in a motor vehicle activates a rain sensor 12, whose measurement signals 14 are a measure for the moisture on a front windshield, not shown, in the wiping region of a front windshield wiper 26. The measurement signals are further conducted to a signal input 16 of a control 18. The control 18 has two signal outputs 20, 22. The drive 24 of the front windshield wiper 26 is actuated with the one signal output 20, while the drive 28 of a rear window wiper 30 is actuated with the further signal output 22. By way of a further signal input 32, the control 18 obtains, as further input signals 34, speed signals of a speed indicator 36, for example a tachometer. The control 18 has means 38 that effect a vehicle-specific default setting of the duty cycle of the control signals 42, 40 at the signal output 20 and at the further signal output 22 for actuating the front windshield wiper 26 and the rear window wiper 30, respectively. The clock of the further control signals 40 differs to a greater or lesser extent from that of the control signals 42.

The control device 50 of the invention includes the control 18, the rain sensor 12, the speed indicator 36 and the operator element 10. The device is supplied via the electrical system of the motor vehicle, and operates in the following manner:

To set the front windshield wiper 26 in operation, the operator element 10 must be switched on. This process activates the rain sensor 12, which measures the quantity of moisture on the front windshield, not shown, in the wiping area of the front windshield wiper 26, and is therefore mounted to the inside of the front windshield of the motor vehicle. The control 18 uses the measurement signals 14 of the rain sensor 12 to automatically regulate the wiping frequency of the front windshield wiper 26 in that control signals 42 are supplied to the drive 24 of the front windshield wiper 26 via the signal output 20. If a large quantity of moisture is measured, the front windshield wiper wipes with a high wiping frequency. If the moisture quantity decreases or is correspondingly smaller, the wiping frequency is decreased or is lower.

At the further signal output 22, the control 18 of the control device 50 of the invention provides further control signals 40 for the drive 28 of a rear window wiper 30. The rear window wiper 30 is likewise operated automatically based on the same measurement signal 14 of the rain sensor 12 at the signal input 16 of the control 18.

In most cases, the optimum wiping frequency of the rear window wiper 30 is lower than that of the front windshield wiper 26. This is explained by the fact that more precipitation impacts the front windshield than the rear window when the vehicle is stopped or in motion. When the vehicle is stopped, only the angle of inclination with respect to the horizontal line of the rear window, which is usually larger than that of the front windshield, has an effect on the quantity of impacting moisture. When the vehicle is set in motion, the quantity of impacting moisture increases on the front windshield, and decreases on the rear window, as the vehicle speed increases. When a certain speed is attained and a certain quantity of water is present on the road, road spray from the rear wheels additionally splashes onto the rear window. To be able to take into account the described, speed-dependent influence, the control 18 has the further signal input 32, by way of which it obtains the input signals 34 of the speed indicator 36, whose measured speed values 34 are supplied to the control 18 by way of a bus system.

The default setting of the wiping-frequency ratio of the rear window wiper 30 to the front windshield wiper 26 is predetermined by the vehicle data of the vehicle manufacturer. In the process, the ratio of the angles of inclination between the rear and front windows is determined, and the shape of the vehicle rear is considered, e.g. to account for road spray. For example, less road spray hits the rear window of a notchback than the rear window of a station wagon. The influence of the vehicle-specific shape can be considered by the means 38 that effect the default setting of the wiping frequency. These means 38 can be, for example, a program control or a microprocessor. The default setting of the wiping-frequency ratio can assume the value of 1:10 or 1:5. As the vehicle speed increases, the signals 34 of the tachometer 36 decrease this cycle ratio, and increase it again as of a certain speed, when road spray occurs.

Alternative embodiments are semi-automatic wiper control (intermittent operation with a rain sensor and continuous operation without a rain sensor) or manual wiper control (no rain sensor). In this case as well, the wiping frequency of the rear window wiper 30 can be set based on the default setting and the vehicle speed. If the front windshield wiper 26 wipes with a constant, manually-set wiping frequency in continuous or intermittent operation, the wiping frequency of the rear window wiper no longer varies with the quantity of precipitation, but only with the speed.

In a simpler realization of the above-described embodiments, the further input signal 34 of the speed indicator 36 only indicates that a predetermined speed has been exceeded or not met. A possible preset speed is 30 kilometers/hour.

What is claimed is:

1. A control device for a front windshield wiper of a motor vehicle comprising: a control unit having at least one signal output providing first control signals to actuate the front windshield wiper, a further signal output for providing further control signals which differ from the first control signals, to actuate a rear window wiper of the motor vehicle, and at least a first signal input, said control unit being responsive to signals at said at least one signal input to individually provide said first and further control signals to independently control said front and rear wind shield wipers; a further signal input for said control unit for receiving further input signals that are a measure of the vehicle speed be actuated; and said control unit is responsive to said further input signal to influence the further control signals for the rear windshield wiper.

2. The control device for a windshield wiper according to claim 1, further including an operator element connected to said first signal input and with which the driver of the motor vehicle can turn the control unit of the window wipers on and off, and select one of a continuous and an intermittent wiping operation.

3. The control device for a windshield wiper according to claim 2, further comprising a rain sensor that is connected to said first signal input of the control unit, and whose measurement signals are a measure of the moisture on the front windshield in the wiping region of the front windshield wiper.

4. The control device for a windshield wiper according to claim 3, wherein the control unit further includes means that effect a default setting of the wiping frequency for the further control signals based on the vehicle-specific shape of the rear window of the vehicle and the vehicle rear.

5. The control device for a windshield wiper according to claim 4, wherein the further control signals clock the drive of the rear window wiper as a function of the setting of the operator element, and at least one of the moisture on the front windshield, the vehicle speed, and the default setting.

* * * * *